United States Patent
Bedner et al.

(10) Patent No.: US 7,083,025 B2
(45) Date of Patent: Aug. 1, 2006

(54) METHOD FOR IMPLEMENTING VEHICLE STABILITY ENHANCEMENT REFERENCE MODELS FOR ACTIVE STEER SYSTEMS

(75) Inventors: Edward J. Bedner, Brighton, MI (US); Karen A. Boswell, Freeland, MI (US); John D. Martens, New Hudson, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/426,302

(22) Filed: Apr. 30, 2003

(65) Prior Publication Data
US 2003/0221899 A1 Dec. 4, 2003

Related U.S. Application Data

(60) Provisional application No. 60/385,308, filed on Jun. 3, 2002, provisional application No. 60/385,329, filed on Jun. 3, 2002, provisional application No. 60/385,328, filed on Jun. 3, 2002, provisional application No. 60/385,284, filed on Jun. 3, 2002.

(51) Int. Cl.
*B62D 5/04* (2006.01)
(52) U.S. Cl. ............... 180/402; 180/446; 701/42
(58) Field of Classification Search ........... 180/402, 180/446; 701/41, 42, 43, 44
See application file for complete search history.

(56) References Cited

U.S. PATENT DOCUMENTS

| | | | | |
|---|---|---|---|---|
| 4,984,646 A * | 1/1991 | Sano et al. | ........... | 180/402 |
| 5,181,173 A * | 1/1993 | Avitan | ........... | 701/42 |
| 5,423,391 A * | 6/1995 | Shimizu | ........... | 180/446 |
| 5,978,726 A * | 11/1999 | Takeda et al. | ........... | 701/84 |
| 6,155,377 A * | 12/2000 | Tokunaga et al. | ........... | 180/446 |
| 6,212,461 B1 | 4/2001 | Ghoneim et al. | | |
| 6,219,602 B1 | 4/2001 | Badenoch et al. | | |
| 6,438,483 B1 | 8/2002 | Loudon et al. | | |
| 6,466,857 B1 | 10/2002 | Belvo | | |
| 6,499,559 B1 | 12/2002 | Mc Cann et al. | | |
| 6,588,859 B1 | 7/2003 | Loudon et al. | | |
| 2002/0035424 A1* | 3/2002 | Kaufmann et al. | ........... | 701/41 |
| 2002/0107621 A1* | 8/2002 | Byers et al. | ........... | 701/41 |
| 2003/0114970 A1* | 6/2003 | Hara | ........... | 701/41 |

* cited by examiner

*Primary Examiner*—Kevin Hurley
(74) *Attorney, Agent, or Firm*—Michael D. Smith

(57) ABSTRACT

A method for implementing a vehicle stability enhancement (VSE) system for a vehicle is disclosed. In an exemplary embodiment, the method includes receiving a handwheel angle input and adjusting the handwheel angle input in response to a variable steering ratio generated in the vehicle. The adjusted handwheel angle input is inputted into a reference model, the reference model thereby outputting one or more desired vehicle handling aspects.

9 Claims, 2 Drawing Sheets

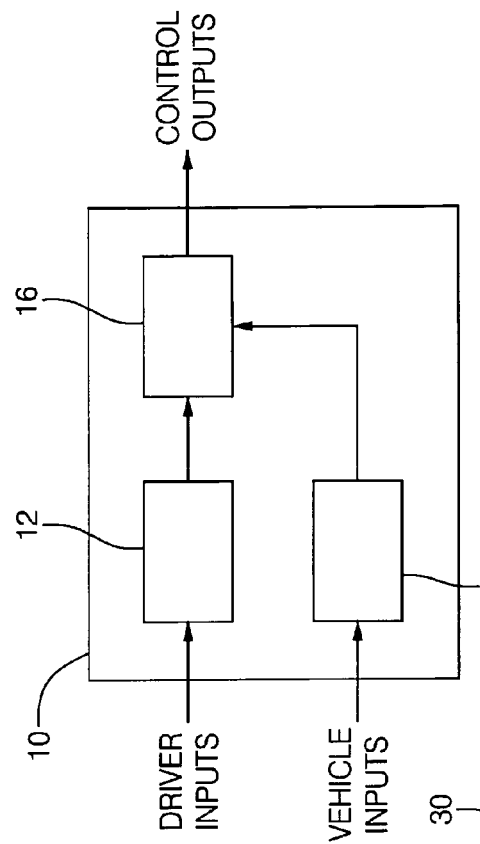
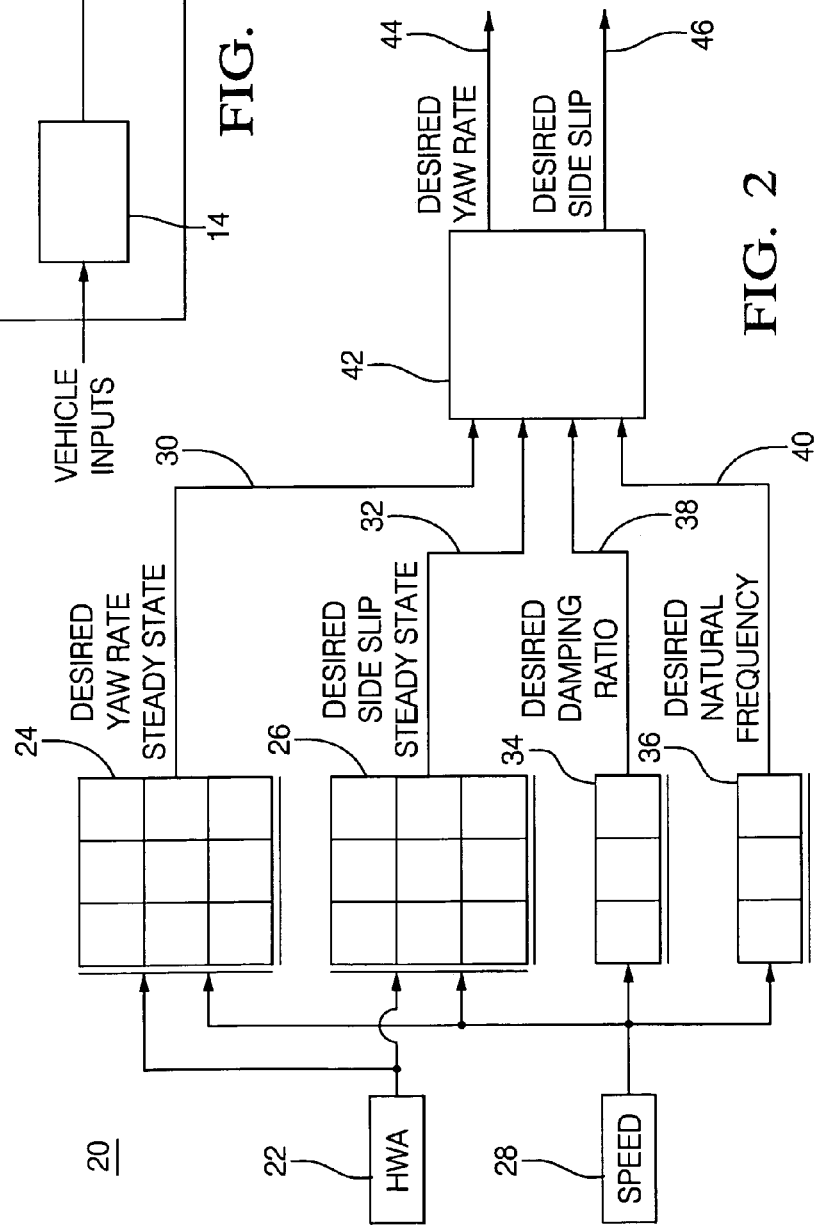
FIG. 1
FIG. 2

METHOD FOR IMPLEMENTING VEHICLE STABILITY ENHANCEMENT REFERENCE MODELS FOR ACTIVE STEER SYSTEMS

CROSS-REFERENCE TO RELATED APPLICATIONS

This application claims the benefit of: U.S. Provisional Patent Application No. 60/385,308, filed Jun. 3, 2002; U.S. Provisional Patent Application No. 60/385,329, filed Jun. 3, 2002; U.S. Provisional Patent Application No. 60/385,328, filed Jun. 3, 2002; and U.S. Provisional Patent Application No. 60/385,284, filed Jun. 3, 2002 the contents of which are incorporated by reference herein in their entirety.

BACKGROUND

The present disclosure relates generally to automobile steering systems and, more particularly, to a method for implementing a vehicle stability enhancement (VSE) system reference model for compatibility with variable ratio (VR) steer control used in active front steering (AFS).

Vehicle Stability Enhancement (VSE) systems currently in existence typically employ a "Reference Model" algorithm that calculates a desirable handling motion for the vehicle. Such reference model algorithms have traditionally assumed that the desirable handling motion of the vehicle is solely a function of handwheel angle and vehicle speed. However, with the advent of newer vehicle systems such as active front steering (AFS) and steer-by-wire (SBW), the desirable handling motion is no longer simply a function of handwheel angle and vehicle speed.

In an AFS system, there is the ability to dynamically change the overall steer system ratio between the handwheel and the steered road wheels. The term "active steering" relates to a vehicular control system in which a generated output is added to or subtracted from the front steering angle, wherein the output is typically responsive to the yaw and/or lateral acceleration of the vehicle. In some situations, an active steering control system may react more quickly and accurately than an average driver to correct transient handling instabilities. In addition, active steering can also provide for variable steering ratios in order to reduce driver fatigue while improving the feel and responsiveness of the vehicle.

For example, at very low speeds, such as that which might be experienced in a parking situation, a relatively small rotation of the hand-wheel may be supplemented using an active steering system in order to provide an increased steering angle to the steerable road wheels. In other words, a motion of the handwheel may be supplemented by an additional motion, such as that from a differential steering actuator, which in turn translates into a motion of the steerable road wheels that does not necessarily correspond to the given motion of the handwheel. Accordingly, in order to provide closed-loop stability control for an AFS system, the VSE reference model should take into account any changes as a result of the VR control.

SUMMARY

The above discussed and other drawbacks and deficiencies of the prior art are overcome or alleviated by a method for implementing a vehicle stability enhancement (VSE) system for a vehicle. In an exemplary embodiment, the method includes receiving a handwheel angle input and adjusting the handwheel angle input in response to a variable steering ratio generated in the vehicle. The adjusted handwheel angle input is inputted into a reference model, the reference model thereby outputting one or more desired vehicle handling aspects.

Preferably, the variable steering ratio is generated by an active front steering system in which adjusting the handwheel angle input comprises summing an offset angle with the handwheel angle input to produce an effective handwheel angle input. The offset angle is a function of the variable steering ratio. In addition, the vehicle speed is also inputted into the reference model. The desired vehicle handling aspects include a desired yaw rate and a desired sideslip.

In another embodiment, a vehicle stability enhancement system includes a vehicle reference model for determining one or more desired vehicle handling aspects in response to a handwheel angle input. The handwheel angle input is adjusted in response to a variable steering ratio generated in the vehicle. A control block receives the desired vehicle aspects and generates vehicle control outputs in response to the desired vehicle aspects, and in response to vehicle inputs thereto.

BRIEF DESCRIPTION OF THE DRAWINGS

Referring to the exemplary drawings wherein like elements are numbered alike in the several Figures:

FIG. 1 is a block diagram representative of an exemplary Vehicle Stability Enhancement (VSE) system;

FIG. 2 is a block diagram that represents an existing VSE reference model algorithm used within a VSE system;

DETAILED DESCRIPTION

Figure 3:
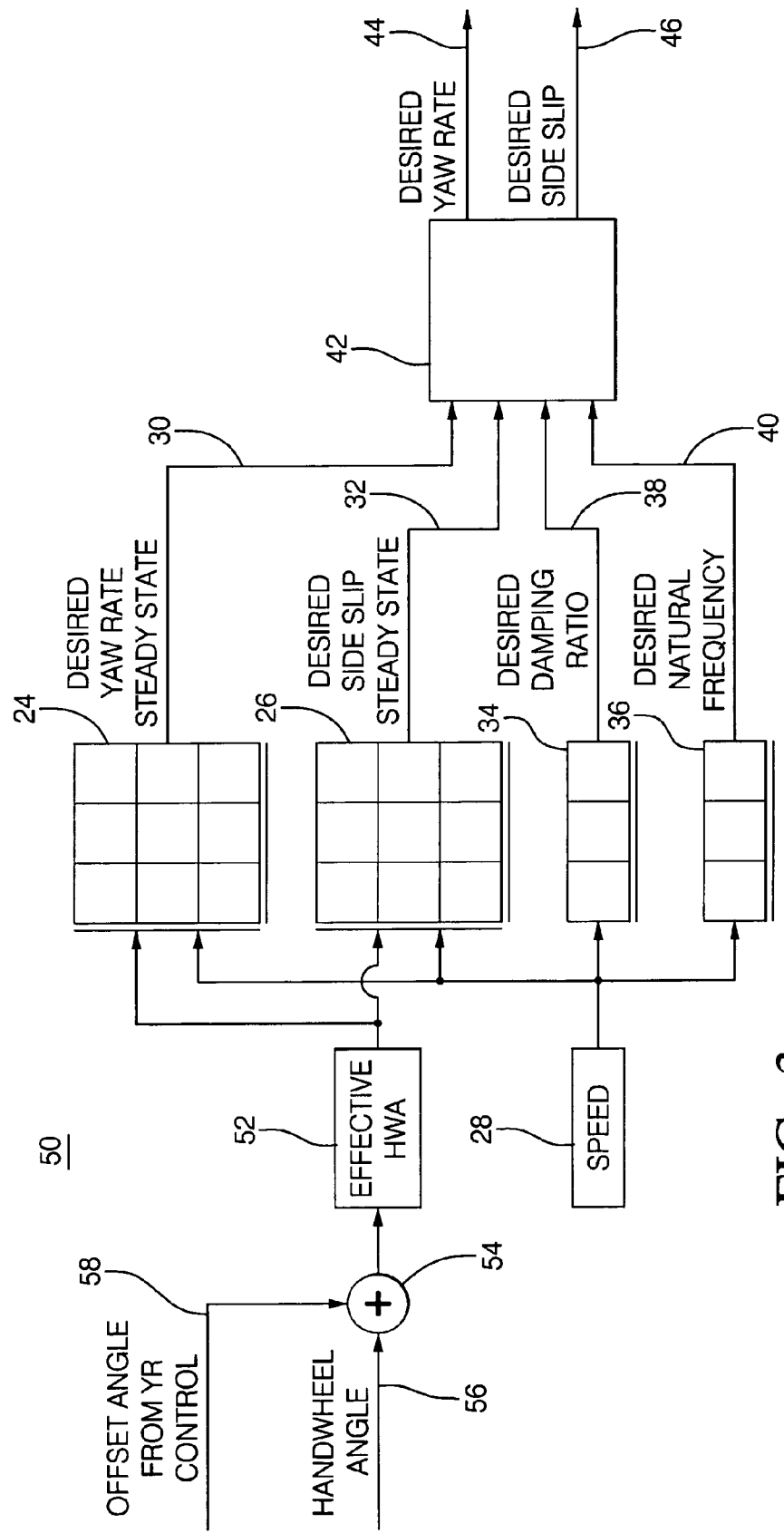
FIG. 3 is a block diagram that represents a modified VSE reference model algorithm compatible with an active front steering (AFS) system, in accordance with an embodiment of the invention.

Referring initially to FIG. 1, there is shown a simplified block diagram of an exemplary Vehicle Stability Enhancement (VSE) system 10. The VSE system 10 provides closed-loop, yaw rate control to achieve vehicle stability objectives. In addition to open-loop driver inputs, the system 10 also uses vehicle inputs to generate the control outputs applied therein. As is shown in FIG. 1, the driver inputs (e.g., handwheel position, vehicle speed) are sent through a vehicle reference model 12. As will be described in further detail, the vehicle reference model 12 uses a reference model algorithm to generate desired vehicle handling aspects such as desired yaw rate and sideslip. The various vehicle inputs (e.g., sensed yaw rate, lateral acceleration) are sent through a vehicle state estimator 14 that, in addition to filtering sensed inputs, also provides other parameter estimation outputs that are not directly measured through sensing means. The outputs of both the vehicle reference model 12 and the vehicle state estimator 14 are inputted to vehicle control block 16 that ultimately provides the control outputs.

FIG. 2 is a block diagram that represents an existing VSE reference model algorithm 20 found in the vehicle reference model 12. The existing algorithm 20 uses lookup tables to determine four aspects of the desirable handling motion, specifically (1) a desired yaw rate; (2) a desired sideslip, (3) a desired damping ratio, and (4) a desired natural frequency. As shown in FIG. 2, algorithm 20 inputs the handwheel angle (HWA) 22 to lookup tables 24 and 26. In addition, the vehicle speed 28 is also inputted into lookup tables 24 and 26. The output 30 of lookup table 24 is a desired, steady state yaw rate. The output 32 of lookup table 26 is a desired, steady state sideslip. In addition, the vehicle speed 28 is further inputted into lookup tables 34 and 36. The output 38 from lookup table 34 yields the desired damping ratio, while the output 40 from lookup table 36 yields the desired natural frequency. Then, each of the lookup table outputs 30, 32, 38 and 40, are inputted into a filter 42 to produce a desired, dynamic yaw rate 44 and a desired, dynamic sideslip 46. These dynamic handling aspects are, among other inputs, used by the control block 16 in FIG. 1 to ultimately generate control outputs.

As stated previously, however, the desirable handling motion of a vehicle is no longer simply a function of the actual handwheel angle, since the AFS will change the physical relationship between the handwheel and the steered road wheels. Thus, to effectively provide stability enhancement, the VSE reference model needs to take into account the effect of the variable ratio aspect of an AFS system.

Therefore, in accordance with an embodiment of the present invention, there is disclosed a method for configuring a vehicle stability enhancement (VSE) system reference model for compatibility with variable ratio (VR) steer control used in active front steering (AFS). Referring now to FIG. 3, there is shown block diagram that represents a modified VSE reference model algorithm 50. As can be seen, the handwheel angle input 22 has been replaced by an "effective handwheel angle" input 52. The effective handwheel angle input 52, provided to lookup tables 24 and 26, is essentially representative of a modified handwheel angle generated by the output of a summing block 54 that has the actual handwheel angle 56 and an offset angle 58 as inputs thereto.

The offset angle input 58 is generated as a result of the VR control aspect of an active front steering system. An understanding of the application of the effective handwheel angle input to the VSE system may be obtained upon consideration of the following example. It will first be assumed that a vehicle without AFS has a fixed steering ratio of 15:1; that is, for every 15 degrees of handwheel angle input, the steering system causes the steerable wheels (e.g., the front wheels) to be turned 1 degree of steering angle. Thus, if the handwheel is turned 90 degrees to the right of center, the front wheels are turned 6 degrees to the right of center. Since this ratio is fixed, the handwheel angle itself is used as an input to the reference model to determine driver intent in the form of desired yaw rate and sideslip.

On the other hand, an AFS system having VR control will create a varied steering ratio. Assuming further, for example, that at a certain speed the steering ratio due to VR control is decreased from 15:1 to 7.5:1. In this case, a 90 degree handwheel input results in the wheels being turned 12 degrees to the right of center. Thus, in order to compensate for this ratio change with regard to the VSE system, an offset angle is added (or subtracted) from the actual handwheel angle. Thereby, the reference model receives an input indicative of the driver's intent without the change in steering ratio.

It will thus be appreciated that by using the "effective handwheel angle" as an input, a VSE reference model will generate the correct desired states for a closed loop stability function, thereby allowing both VR control and stability control to coexist without conflicts therebetween. Although the embodiments depicted are in the context of a steering-based VSE system, the principles herein are equally applicable to other stability systems employing reference models, such as a brake-based stability system.

In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as a data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer implemented method for implementing a vehicle stability enhancement (VSE) system for a vehicle, the method comprising:
   receiving a handwheel angle value utilizing a computer;
   adjusting said handwheel angle value in response to a variable steering ratio generated in the vehicle, utilizing said computer; and
   inputting said adjusted handwheel angle value into a reference model algorithm utilized in said computer, said reference model algorithm outputting at least one of a desired yaw rate value and a desired side slip value associated with said vehicle, based on said adjusted handwheel value.

2. The method of claim 1, wherein said variable steering ratio is generated by an active front steering system.

3. The method of claim 1, wherein said adjusting said handwheel angle value comprises summing an offset angle value with said handwheel angle value to produce an effective handwheel angle value, said offset angle value being a function of said variable steering ratio.

4. The method of claim 1, further comprising inputting a vehicle speed value into said reference model algorithm.

5. The method of claim 4, wherein the reference model algorithm utilizes first and second lookup tables and a filter, the method further comprising:
   outputting a first yaw rate value from the first lookup table based on said adjusted handwheel value and said vehicle speed value;
   outputting a first side slip value from the second lookup table based on said adjusted handwheel value and said vehicle speed value;

receiving said first yaw rate value and said first side slip value at the filter; and calculating said desired yaw rate value and said desired side slip value utilizing said filter, based on said first yaw rate value and said first side slip value.

6. A storage medium encoded with a machine readable computer program code comprising instructions configured to cause a computer to implement a method of implementing a vehicle stability enhancement (VSE) system for a vehicle, the method further comprising:

receiving a handwheel angle value utilizing said computer;

adjusting said handwheel angle value in response to a variable steering ratio generated in the vehicle, utilizing said computer; and inputting said adjusted handwheel angle value into a reference model algorithm utilized in said computer, said reference model algorithm outputting at least one of a desired yaw rate and a desired side slip value associated with said vehicle, based on said adjusted handwheel angle value.

7. The storage medium of claim 6, wherein the method further comprises summing an offset angle value with said handwheel angle value to obtain an effective handwheel angle value, said offset angle value being a function of said variable steering ratio.

8. The storage medium of claim 6, wherein the method further comprises inputting a vehicle speed value into said reference model algorithm.

9. The storage medium of claim 6, wherein the method further comprises:

outputting a first yaw rate value from the first lookup table based on said adjusted handwheel value and said vehicle speed value;

outputting a first side slip value from the second lookup table based on said adjusted handwheel value and said vehicle speed value;

receiving said first yaw rate value and said first side slip value at said filter; and calculating said desired yaw rate value and said desired side slip value utilizing said filter, based on said first yaw rate value and said first side slip value.

\* \* \* \* \*